US010069736B2

United States Patent
Oran et al.

(10) Patent No.: US 10,069,736 B2
(45) Date of Patent: Sep. 4, 2018

(54) OPTIMIZED IN-NETWORK RETRANSMISSION FOR INFORMATION-CENTRIC NETWORKING PROTOCOLS

(71) Applicant: CISCO TECHNOLOGY, INC., San Jose, CA (US)

(72) Inventors: David R. Oran, Cambridge, MA (US); James Cameron Gibson, Belmont, MA (US); Maziar Mirzazad Barijough, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 15/144,551

(22) Filed: May 2, 2016

(65) Prior Publication Data
US 2017/0317933 A1 Nov. 2, 2017

(51) Int. Cl.
*H04L 12/803* (2013.01)
*H04L 12/801* (2013.01)
*H04L 12/721* (2013.01)
*H04L 12/707* (2013.01)
*H04L 5/00* (2006.01)
*H04L 12/733* (2013.01)

(52) U.S. Cl.
CPC .......... *H04L 47/125* (2013.01); *H04L 5/0055* (2013.01); *H04L 45/20* (2013.01); *H04L 45/22* (2013.01); *H04L 45/72* (2013.01); *H04L 47/17* (2013.01)

(58) Field of Classification Search
CPC ....... H04L 47/125; H04L 47/17; H04L 45/22; H04L 45/20; H04L 45/72
See application file for complete search history.

(56) References Cited

U.S. PATENT DOCUMENTS

| 8,780,696 | B2 * | 7/2014 | Enyedi ................... H04L 45/00 370/217 |
| 9,215,163 | B2 * | 12/2015 | Sugisono ............... H04L 45/02 |
| 9,450,668 | B2 * | 9/2016 | Nozaki ................. H04B 7/2606 |
| 2010/0091823 | A1 * | 4/2010 | Retana .................... H04L 45/02 375/211 |
| 2010/0195560 | A1 * | 8/2010 | Nozaki .................. H04B 7/155 370/315 |
| 2012/0039164 | A1 * | 2/2012 | Enyedi ................... H04L 45/00 370/217 |
| 2013/0275464 | A1 | 10/2013 | Kim et al. |
| 2014/0181140 | A1 * | 6/2014 | Kim ........................ H04L 67/06 707/769 |

(Continued)

*Primary Examiner* — Redentor M Pasia

(57) ABSTRACT

One embodiment includes receiving a notification at a communications network node; determining a lowest cost path for implementing a next hop for the notification; determining a best alternate path for the next hop; comparing a cost of the best alternate path with a value stored in a notification header field; updating the header field value to equal the cost of the best alternate path if the cost of the best alternate path is less than the header field value; and forwarding the notification along the lowest cost path. Some embodiments include receiving a NACK at the node; comparing a cost of the best alternate path with a NACK header field value; and retransmitting the notification along the best alternate path if the NACK header field value is greater than or equal to the cost of the best alternate path.

20 Claims, 8 Drawing Sheets

(56) References Cited

U.S. PATENT DOCUMENTS

2015/0039754 A1* 2/2015 Gupta ................ H04L 43/0864
  709/224
2016/0043963 A1  2/2016 Oran
2017/0093713 A1* 3/2017 Garcia-Luna-Aceves ...................
  H04L 45/50

* cited by examiner

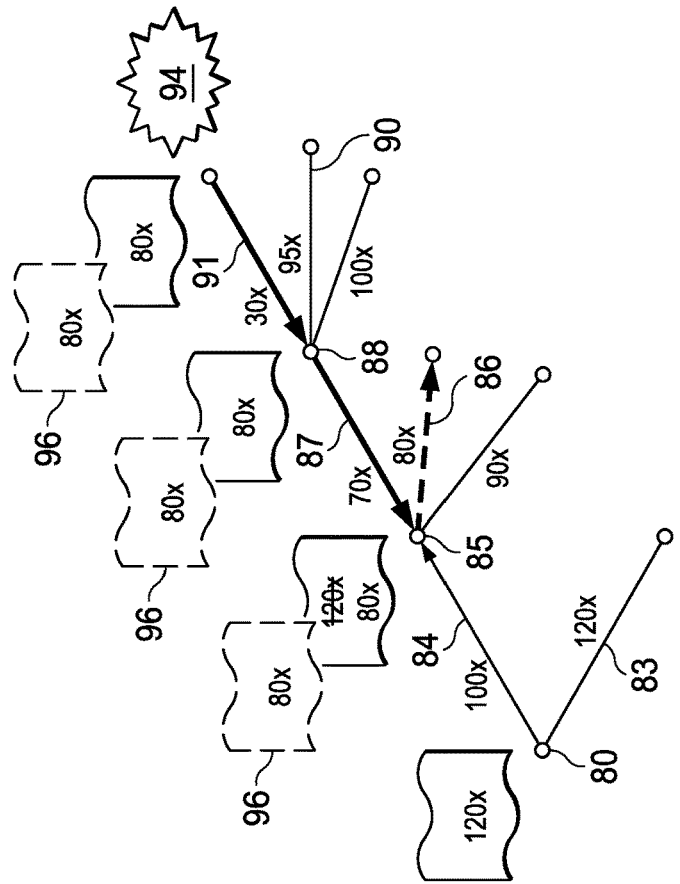
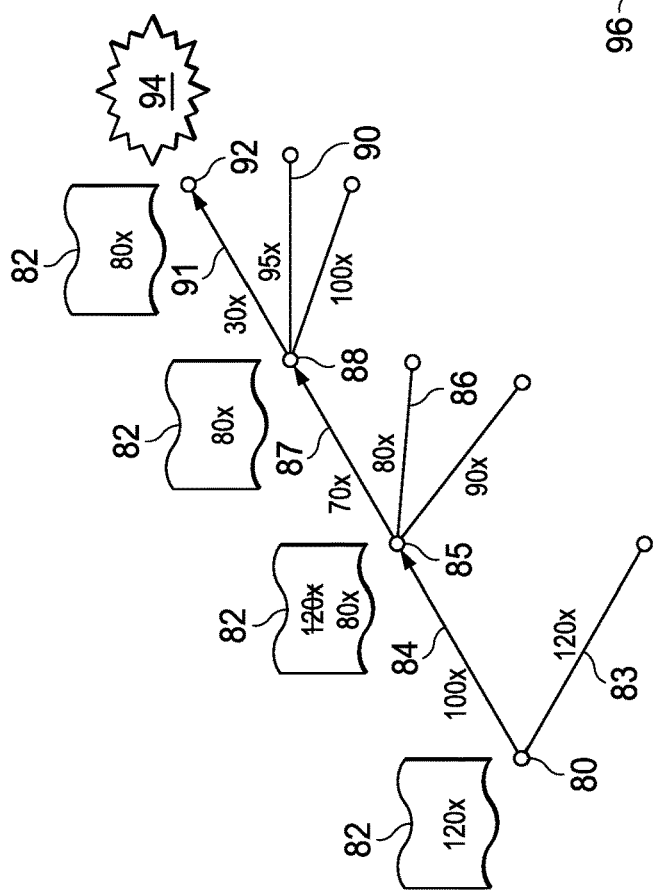
FIG. 5B
FIG. 5A

OPTIMIZED IN-NETWORK RETRANSMISSION FOR INFORMATION-CENTRIC NETWORKING PROTOCOLS

TECHNICAL FIELD

This disclosure relates in general to the field of communications networks and, more particularly, to techniques for optimized in-network retransmission of data for information-centric networking protocols in connection with such communications networks.

BACKGROUND

Information-Centric Networking ("ICN") is becoming more and more popular with both industry and the research community due to the advantages of such networks. Much research has gone into addressing congestion issues in ICN and how to deal with congestion that causes messages to not be delivered. An Interest message that is dropped, or NACKed, due to congestion will generally need to be retransmitted, since the consumer will still be interested in receiving the data. This begs the question of whether the retransmission is best generated by the consumer (i.e., an end-to-end retransmission) or whether the network can perform better by retransmitting the Interest message on another path (i.e., an in-network retransmission).

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5A illustrates an example of propagation of an Interest toward a producer in accordance with embodiments described herein for implementing techniques for optimized in-network retransmission for information-centric networking protocols;

FIG. 5B illustrates an example of propagation of a NACK back toward a consumer in accordance with embodiments described herein for implementing techniques for optimized in-network retransmission for information-centric networking protocols;

DETAILED DESCRIPTION OF EXAMPLE EMBODIMENTS

Overview

One embodiment includes receiving a notification at a communications network node; determining a lowest cost path for implementing a next hop for the notification; determining a best alternate path for the next hop; comparing a cost of the best alternate path with a value stored in a notification header field; updating the header field value to equal the cost of the best alternate path if the cost of the best alternate path is less than the header field value; and forwarding the notification along the lowest cost path. Some embodiments include receiving a NACK at the node; comparing a cost of the best alternate path with a NACK header field value; and retransmitting the notification along the best alternate path if the NACK header field value is greater than or equal to the cost of the best alternate path.

Example Embodiments

A goal of ICN is to evolve the infrastructure of the Internet away from a host-centric paradigm, which is based on addressing the sources and sinks of traffic, toward a network architecture in which the focal point is "named information" (or content or data). In this paradigm, end-host and in-network storage may be transparently capitalized upon (since bits in the network and on storage devices are handled identically), mobility and multi-access are the norm, and anycast, multicast, and broadcast are natively supported. Additionally, in this paradigm, data becomes independent from location, application, storage, and means of transportation, enabling in-network caching and replication. Benefits of ICN include improved efficiency, better scalability with respect to information and bandwidth demand, and improved robustness in challenging communication scenarios.

ICN concepts can be applied to different layers of the protocol stack. For example, name-based data access can be implemented on top of the existing IP infrastructure, e.g., by providing resource naming, ubiquitous caching, and corresponding transport services, or it can be seen as a packet-level internetworking technology that would cause fundamental changes to Internet routing and forwarding. In summary, ICN is expected to evolve the Internet architecture at different layers.

As previously noted, in ICN, network primitives are based on named data rather than host identifiers. Data retrieval is triggered by user requests that are forwarded toward a copy of the desired content item. Data can be retrieved either from a server that permanently provides a content item or from a temporary item copy opportunistically cached by an in-network node. ICN clients, or "consumers," request data in a pull-based fashion, sending Interests for named contents. Requests are forwarded hop-by-hop toward a permanent copy of the requested data. For each Interest, an ICN node performs a lookup for the content name in a Forwarding Information Base ("FIB") that stores a set of interfaces through which content can be reached.

Figure 1:
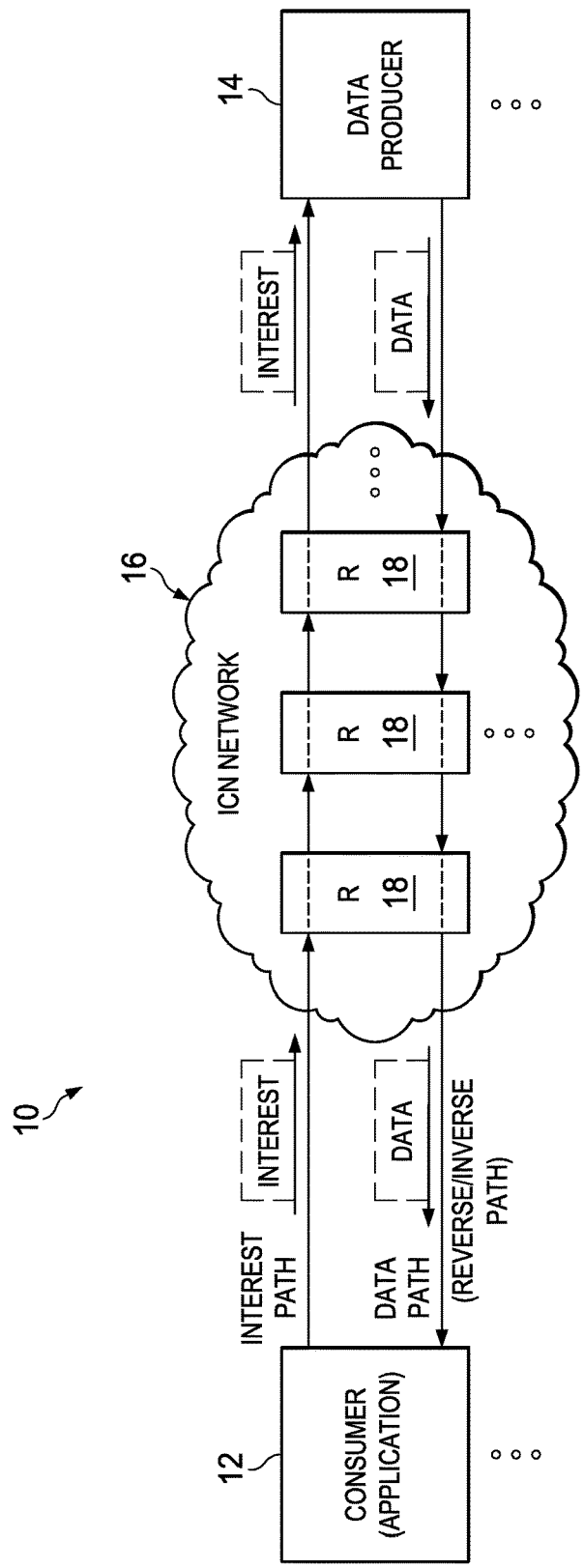
FIG. 1 is a simplified block diagram of a communications environment in which techniques for optimized in-network retransmission for information-centric networking protocols may be implemented in accordance with embodiments described herein.

FIG. 1 illustrates a simplified block diagram of a communications environment 10 in which techniques for optimized in-network retransmission for information-centric networking protocols may be implemented in accordance with embodiments described herein. As shown in FIG. 1, communications environment 10 includes at least one consumer application 12 (also referred to simply as "consumer" or "requestor") for requesting data, at least one data producer 14 for producing and storing the data responsive to requests, and an ICN network 16 that includes multiple network nodes/devices 18 for routing data and requests for data between the consumer application 12 and the data producer 12. In certain embodiments, network nodes 18 may be implemented as routers or switches, for example.

In communications environment 10, communication between consumer 12, data producer 14, and nodes 18 may include exchanges of two types of packets or messages. These include Interest ("I") messages, or simply Interests, and Data ("D") packets, or simply Data. Both types of packets/messages carry a name that identifies a piece of data (i.e., a data object) that may be transmitted in one Data packet. Consumer 12 indicates the name of a desired data object in an Interest message and sends the Interest message toward producer 12 along an interest, or forward, path through the ICN network 16. Nodes 18 use the name to forward the Interest message toward the producer 14 along the interest path. Path segments between adjacent nodes 18 are referred to as "path links" or simply "links."

If the Interest message reaches one of the nodes 18 that has the requested Data already stored therein (e.g., because of a previous request for the same data object), the node will return a Data packet that contains the data object back to the consumer 12 along a data path. The Data packet may include the name of the data/content together with a signature by the producer's key that binds the name to the content. It will be recognized that alternative techniques of providing cryptographic packet integrity and provenance, such as use of hash-based primitives and manifests for binding signatures to whole sets of objects (as opposed to a single packet) may be used in alternative embodiments. If no node 18 includes data that satisfies the Interest, the Interest will be forwarded all the way to the producer 14 and the producer will return the requested data via the network. The entity that returns the requested data is referred to herein as the "data responder" with respect to the Interest. The returned Data packet follows in reverse the interest path back to the consumer 12. Accordingly the data path is also referred to as the "reverse path" or "inverse path" of the interest path, or forward path. The forwarding of the Interest along the interest path and returning of the Data along the reverse path by each node 110 is based on the name of the data, not source and destination addresses as used with Internet Protocol ("IP") routing, for example.

The manner in which congestion control may be implemented in communications environment 10 will now be addressed briefly. In particular, unlike the IP family of protocols (e.g., TCP, DCCP, SCTP), which rely on end-to-end congestion control, ICN employs hop-by-hop congestion control. In certain embodiments, there is a per-Interest/per-Data state at every hop (or router) of the path that may allow, for each outstanding Interest, bandwidth for Data returning on the inverse path to be allocated. One way to do this is to make the allocation using simple Interest counting. In other words, by accepting one Interest message from an upstream node, implicitly this provides a guarantee (either hard or soft) that there is sufficient bandwidth on the inverse direction of the link to send back one Data packet.

Figure 2:
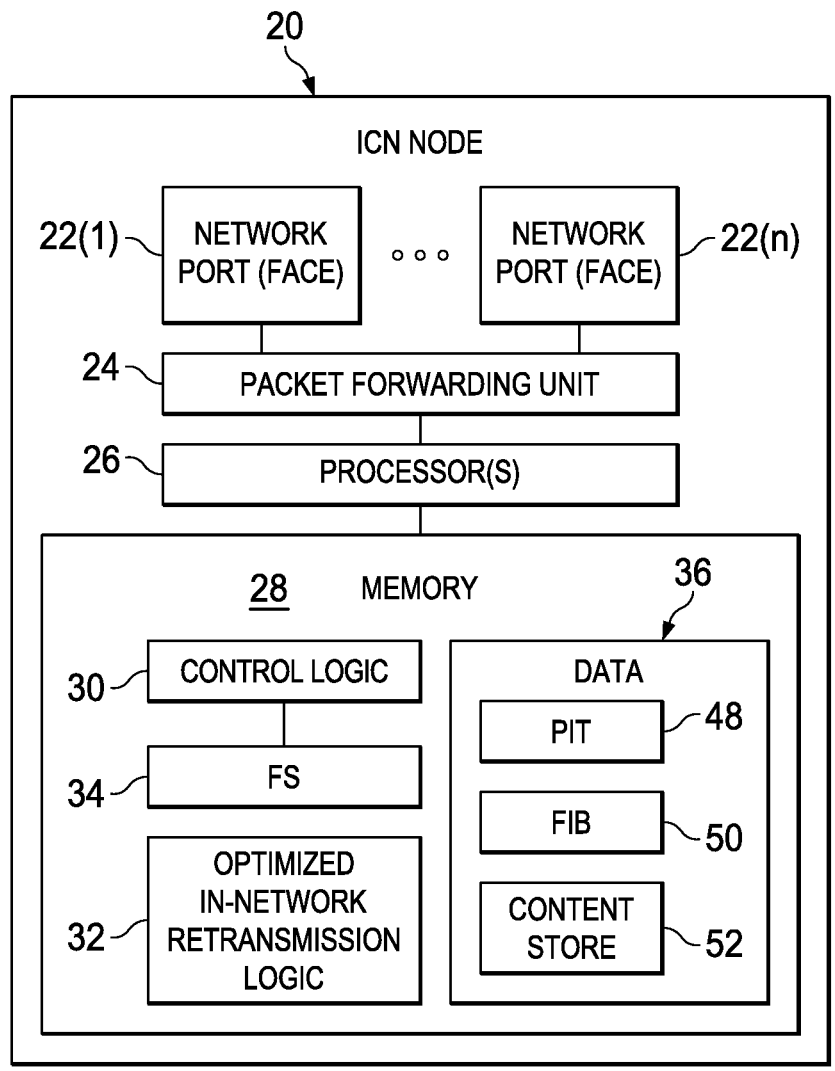
FIG. 2 is a simplified block diagram of an example ICN network device/node configured to implement techniques for optimized in-network retransmission for information-centric networking protocols in accordance with embodiments described herein.

Referring now to FIG. 2, illustrated therein is a simplified block diagram of an example ICN node 20 representative of each of the ICN nodes 18 (FIG. 1). ICN node 20 may be a network device, such as a router or a switch, that has Interest and Data packet forwarding capabilities as well as computing and data processing capabilities to implement techniques for optimized in-network retransmission for information-centric networking protocols in accordance with features of embodiments described herein. To this end, ICN node 20 includes a plurality of network ports, or "faces," $22(1)$-$22(n)$ (which may also be referred to as "interfaces") for receiving and forwarding/transmitting Interests and Data packets, a packet forwarding unit 24 for routing the Interests and Data packets between network ports/faces, at least one processor 26, and memory 28.

Memory 28 may comprise read only memory ("ROM"), random access memory ("RAM"), magnetic disk storage media devices, optical storage media devices, flash memory devices, electrical, optical, or other physical/tangible (non-transitory) memory storage devices. The processor is, for example, a microprocessor or a microcontroller that executes instructions stored in memory. Thus, in general, memory 28 may comprise one or more tangible computer readable storage media (e.g., a memory device) encoded with software comprising computer executable instructions and when the software is executed (by the processor 26) it is operable to perform the operations described herein. For example, memory 28 stores control logic 30 to provide overall control of network node 20 and optimized in-network retransmission logic 32 to implement techniques for optimized in-network retransmission for information-centric networking protocols in accordance with embodiments described herein. Either control logic 30 or optimized in-network retransmission logic 32 may include a Forwarding Strategy ("FS") module 34 that operates in conjunction with packet forwarding unit 24 to implement an adaptive forwarding strategy, which determines whether, when, and where to forward each Interest packet.

Memory 28 also stores data 36 produced and/or used by logic 30-34. In certain embodiments, data 36 includes one or more of data structures, which may include a Pending Interest Table ("PIT") 48, a Forwarding Information Base ("FIB") 50, and a Content Store ("CS") 52. The PIT 48 stores entries for pending/received Interests that have not yet been satisfied, where each entry includes the data name carried in the Interest together with node incoming and outgoing faces/interfaces traversed by the Interest. The FIB 50 stores the information to determine, for each name prefix known to the name-based routing protocol, which next-hop interface or interfaces to use for forwarding the interest toward the producer. The FIB 50 is populated by a separate name-based routing protocol; any such protocol may be used in concert with this invention. The CS 52 caches or stores data that has been retrieved from a data responder (e.g., data producer 24 or one of the upstream nodes) in a most recent Interest/Data retrieval cycle, or has already been retrieved in a previous data retrieval cycle.

PIT 48 stores state information, including node ingress and egress face information, for each Interest received and sent by ICN node 20 while traversing their respective paths in communications environment 10 so that Data satisfying the Interest may trace the same path in reverse back to consumer 12 (i.e., the inverse path).

Figure 3:
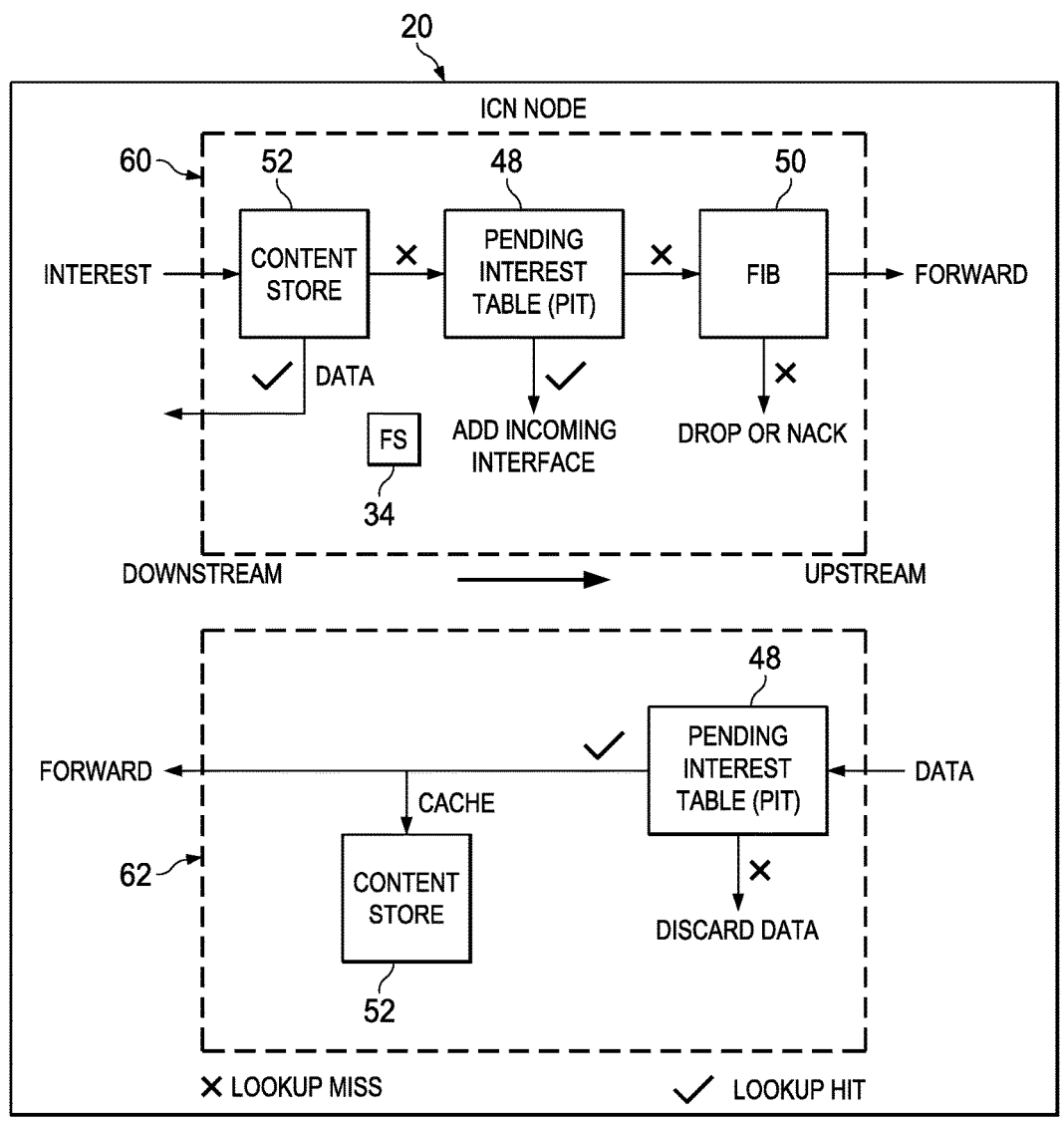
FIG. 3 is a simplified block diagram of example Interest and Data flow paths through the ICN network node of FIG. 2 in accordance with embodiments described herein.

The general operation of ICN node 20 will now be described with reference to FIGS. 2 and 3. FIG. 3 illustrates an Interest flow 60 through ICN node 20 in an upstream or forward direction (i.e., from consumer to producer) and a resulting Data flow 62 through the node 20 in a downstream or reverse/inverse direction (i.e., from responder to consumer). When an Interest arrives at ICN node 20, the node checks the Content Store 52 for matching data; if matching data exists the node returns the Data packet on the interface/face of the node from which the Interest came. Otherwise node 20 looks up the data name included in the Interest in PIT 48, and if a matching entry exists, it records the incoming interface of this Interest in the PIT entry. In the absence of a matching PIT entry, node 20 create a PIT entry and will forward the Interest toward the data producer via an outgoing interface (which is also recorded in the node) based on information in FIB 50 as well as the node's adaptive forwarding strategy as implemented by Forwarding Strategy module 34. When ICN node 20 receives multiple Interests for the same data name from the downstream nodes, in one embodiment the node may forward only the first of the received Interests upstream toward data producer, and drop the other duplicative Interests after recording the incoming interfaces in the corresponding PIT entry, as described above. FIB 50 is populated by a name-prefix based routing protocol, and can have multiple output interfaces for each prefix.

For each Interest, Forwarding Strategy module 34 may retrieve the longest-prefix matched entry from FIB 50, and decide when and where to forward the Interest. Forwarding Strategy module 34 may decide to drop or negatively acknowledge an Interest in certain situations, e.g., if all upstream links are congested or the Interest is suspected to be part of a malicious attack. Content Store 52 is a temporary cache of Data packets node 20 has received. Because a Data packet is meaningful independent of where it comes from or where it is forwarded, it can be cached to satisfy future Interests.

When a Data packet arrives at ICN node 20, the node may find the matching entry in the PIT 48 and forward the data to all downstream interfaces/faces listed in that PIT entry. ICN node 20 may remove that PIT entry, and optionally cache the data in Content Store 52. Data packets always take the reverse path of Interests, and, in the absence of packet losses, one Interest packet results in one Data packet that satisfies the Interest on each link, providing flow balance. To fetch large content objects that comprise multiple packets, Interests provide a similar role in controlling traffic flow as TCP ACKs in the Internet: a fine-grained feedback loop controlled by the consumer of the data. Neither Interest nor Data packets carry any host or interface addresses; ICN routes forward Interest packets toward data producers based on the names carried in the packets, and forward Data packets to consumers based on the PIT state information set up by the Interests at each hop. This Interest/Data packet exchange symmetry allows a hop-by-hop control loop for managing link bandwidth, and may reduce or eliminate the need for source or destination addresses in Data delivery.

For purposes of embodiments described herein, the following characteristics of an ICN node are assumed:

Every node includes an FIB or other forwarding table with a multitude of Name Prefix entries, each with potentially multiple next hops.

Each next hop has a Face and a Cost Metric. The cost metric can be a bandwidth estimate, a smoothed average round trip time, a Hop Count, or any number of other possible metrics.

Each node matches an incoming Interest against the forwarding table, identifies the next hop with the lowest cost, and forwards the Interest on the next hop face.

Figure 4:
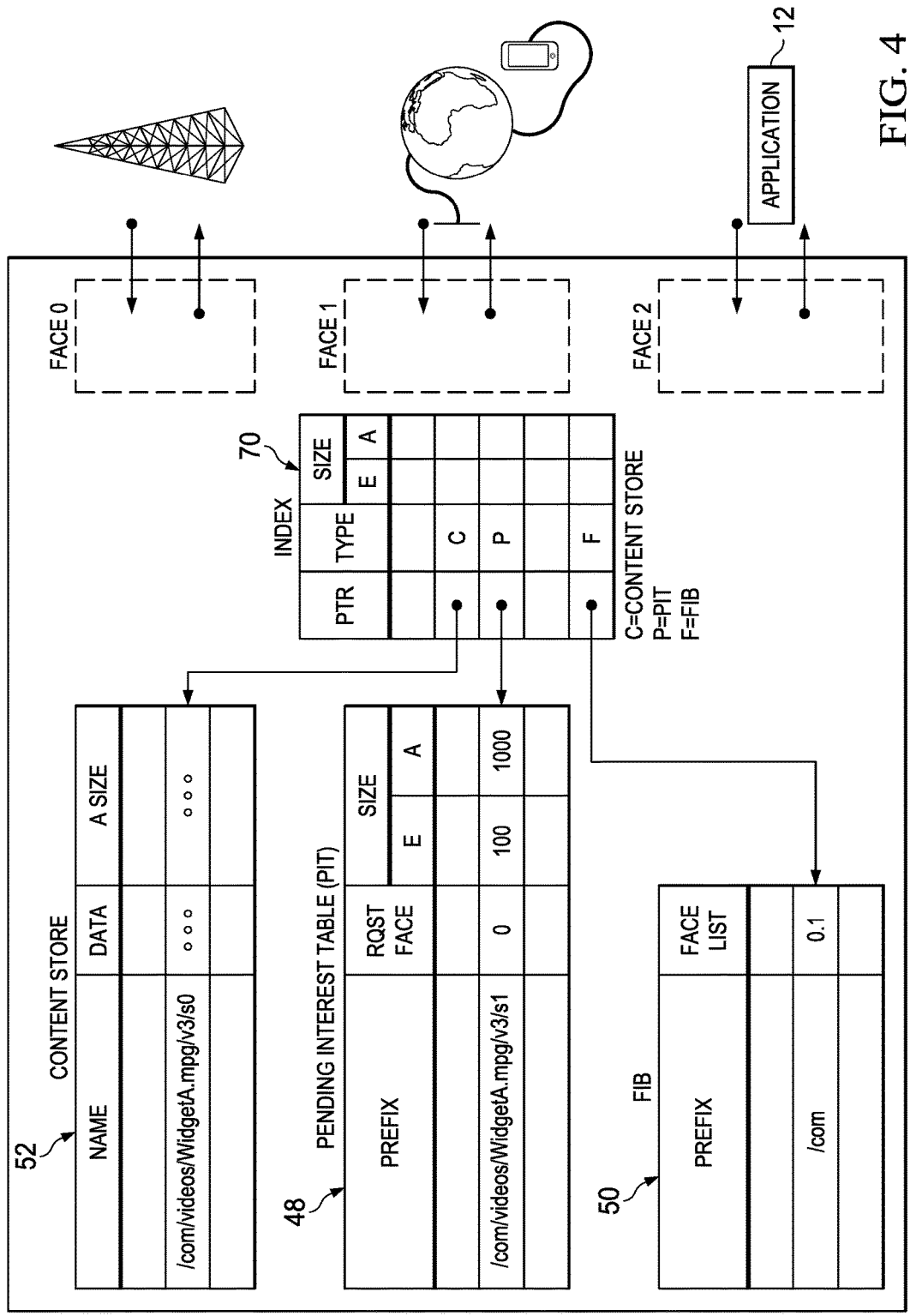
FIG. 4 illustrates example data structures implemented in the ICN network node of FIG. 2 in accordance with embodiments described herein.

Referring now to FIG. 4, depicted therein is a detailed block diagram of example data structures corresponding to the ICN node data structures illustrated in FIG. 2. Also depicted in FIG. 4 are example ICN node interfaces/faces F0-F2 for receiving and sending Interests and Data to satisfy the Interest. Ingress and egress faces F0-F2 for a given Interest and Data corresponding to that Interest are tracked in PIT 48 and FIB 50. In PIT 48, each PIT entry, which is populated based on a corresponding Interest, may include a name carried in the Interest, a node interface/face from which the Interest was received. In FIB 50, each FIB entry may include a name prefix, a list of node interfaces/faces on which the Interest associated with a given data object name may be forwarded. In Content Store 52, each entry may include a name of the content in that entry, and the data content. Data structures in ICN node 20 may also include an index 70 that points to corresponding entries for a given entry in each of Content Store 52, PIT 48, and FIB 50.

In accordance with features of embodiments described herein, an in-network mechanism for ICN protocols is proposed that will equip the Interest Forwarding Strategy to make better decisions about whether and how to perform in-network retransmissions. Basic in-network retransmission strategies select one or more alternate paths on which to retransmit based on local information, by considering the congestion state and load of the feasible alternative interfaces over which the Interest message may be retransmitted. However, purely local information does not take into account the possibility that the best alternate path might be upstream of the router that detected the congestion and wishes to reroute. Only considering the local state can result in suboptimal alternate path selection, worsened congestion, and use multiple retransmissions for a single Interest message.

As part of the mechanism, an ICN node, when forwarding an Interest message to a next hop selected from the Forwarding Information Base ("FIB"), includes additional information about the path cost of a best alternate face on that node. The path cost is the same one used for multipath forwarding and may be derived from the output of the routing calculation or computed from observing the previous behavior of packets forwarded by the Forwarding Strategy or other means. In one embodiment, the cost of the best alternative path or face is carried as an additional TLV field in the ICN Interest message. In the absence of more accurate information, the field is set to a pre-defined MAX value.

Suppose that the Interest Forwarding Strategy at each node is to send the Interest on the face with the lowest cost. If the Interest is rejected or returned to the node through a NAK procedure, the node is permitted to reroute the packet on a different face. A simple in-network retransmission strategy is to retransmit the Interest at most one time, using the alternate best face. This is conventionally a face with the lowest cost of all the feasible forwarding faces as computed by routing that have not already attempted to forward the packet. This state is maintained in the PIT for the particular Interest after the initial forwarding computation via the FIB.

Each node, when initially forwarding the Interest out its best face, will record the cost of its local best alternative face, compare this local cost with the cost received in the incoming Interest, and send the outgoing Interest with the minimum of the two costs. At each node, the received cost is thus the cost of the best alternate interface among all the downstream nodes. If an Interest reaches a congestion point, the Interest will include the cost of the best alternative face along the entire path.

The node that determines the Interest cannot be forwarded due to congestion may generate a Congestion NACK, containing relevant information from the Interest message including the name. In the preferred embodiment, we add, via a new TLV field, the cost of the path's best alternative face. Each node processing the NACK (including the first) may find its best alternate face for that name can compare this local cost with the cost in the NACK. If the local cost is equal to the cost in the NACK, the node will generate an Interest (or modify the returned Interest), using relevant information from the NACK and local PIT entry as necessary, and send the Interest on the alternate interface.

The node that determines the Interest cannot be forwarded due to congestion may generate a Congestion NACK, containing relevant information from the Interest message including the name. In the preferred embodiment, we add, via a new TLV field, the cost of the path's best alternative face. Each node processing the NACK (including the first) may find its best alternate face for that name can compare this local cost with the cost in the NACK. If the local cost is less than or equal to the cost in the NACK, the node will generate an Interest (or modify the NACKed Interest), using relevant information from the NACK and local PIT entry as necessary, and send the Interest on the alternate interface.

The node generating the retransmitted interest may set the best alternate face cost in that Interest to a cost better than any interface could actually have (e.g. 0, assuming all real next hop costs are positive and arithmetically lower costs are preferred) to ensure that only a single Interest retransmission occurs, even if the retransmitted Interest encounters congestion, as no node along the second NACK's path will have an alternate interface with a cost less than that in the message. At least one other scenario is described below.

FIGS. 5A and 5B illustrates an example of an Interest propagated toward a producer and how its information is updated to indicate the best alternate path cost (FIG. 5A) as well as the process of a NACK traversing back to encounter the best alternate path cost (FIG. 5B) to be used for subsequent in-network retransmission of the Interest in accordance with embodiments described herein. In the example illustrated in FIGS. 5A and 5B, cost for a face, or path, is assumed to be related to the Round Trip Time ("RTT") from the node to the producer through the face. FIG. 5A illustrates the process of updating best alternate path cost information included in the Interest. As shown in FIG. 5A, the Interest message takes the best (i.e., lowest cost) path and updates its BA field at each node by comparing it to the local alternate path cost.

For example, at a node 80, an Interest 82 has a BA field with a value of 120x, indicating that a best alternate path at node 80 (designated in FIG. 5A by a reference numeral 83) has a cost of 120x, while a best path 84 has a cost of 100x. At a node 85, it is determined that a best alternate path (designated in FIG. 5A by a reference numeral 86) has a cost of 80x, which is lower than the current value (120x) of the BA field. Therefore, at node 85, the BA field of the Interest 82 is updated to a value of 80x and the Interest proceeds along a best path 87, which has a cost of 70x, to a node 88. At node 88, it is determined that a best alternate path (designated in FIG. 5A by a reference numeral 90) has a cost of 95x, which is higher than the current value (80x) of the BA field; therefore, at node 88, the BA field of the Interest 82 is not changed and the Interest 82 proceeds along a best path 91, which has a cost of 30x, to a node 92. At node 92, congestion 94 is detected. Referring now to FIG. 5B, upon detection of congestion 94 a node 92, a NACK 96 having a BA field with the same value that the interest 82 had at node 92 (80x), is transmitted back toward node 88 along the path 91. At node 88, the value of the BA field (80x) is compared to the cost of the best alternate path 90 (95x). Because the value contained in the BA field is lower than the cost of the best alternate path, the NACK proceeds along the same path previously traversed by the Interest 82 toward node 85. At node 85, the value of the BA field is compared to the cost of the best alternate path 86 (80x). Because the value contained in the BA field is equal to the cost of the best alternate path, the interest is retransmitted from the node 85 along the path 86, rather than returning all the way to the node 80 for retransmission.

Additional scenarios may occur as follows. First, multiple faces with the same best cost may exist along the path. These interfaces are equivalent, so the first (furthest upstream) node with such an interface to receive the Congestion NACK will retransmit the Interest first. As described above, if the retransmitted Interest has a BA field with a cost lower than any face could have, a Congestion NACK on the retransmitted Interest will not in turn lead to a second in-network retransmitted Interest and the second Congestion NACK will trawl all the way to the consumer device.

It may be that no acceptable alternative face is found at any node as the Interest is forwarded upstream and, assuming no change in face state, as the NACK is forwarded downstream. In this case, the NACK will contain previously defined BA value empty (no TLV) and return all the way to the consumer, which always has ultimate responsibility for retransmitting the Interest, or try to retransmit via a path encountering the same congested face one or more times.

Figure 6A:
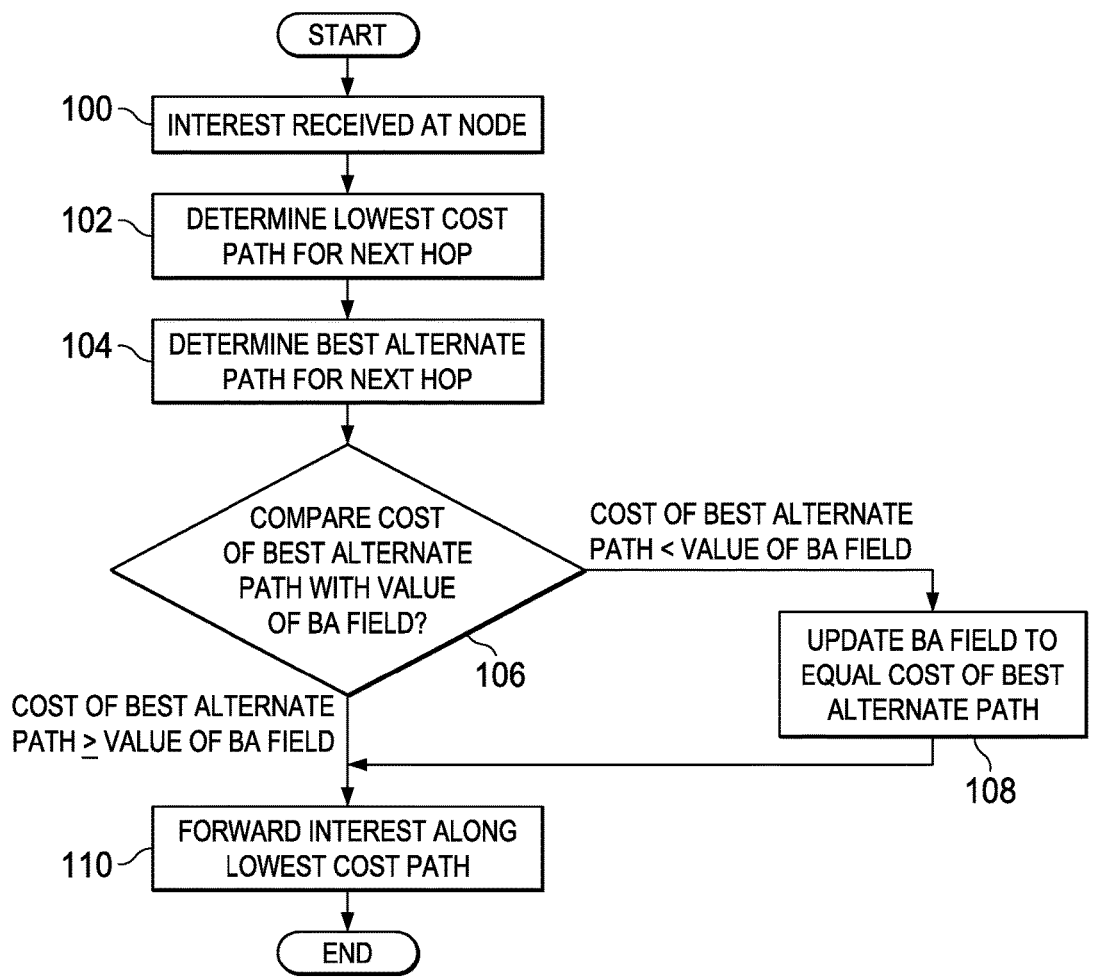
FIG. 6A is a flowchart of steps that may be implemented by the ICN network node of FIG. 2 for performing optimized in-network retransmission for information-centric networking protocols in accordance with embodiments described herein in connection with transmitting an Interest toward a producer.

FIG. 6A is a flowchart of steps that may be implemented by an ICN node, such as ICN node 20, for performing optimized in-network retransmission for information-centric networking protocols in accordance with embodiments described herein in connection with transmitting an Interest toward a producer. Referring to FIG. 5A, in step 100, an Interest is received at the node. In step 102, a lowest cost path for traversing a next hop of the Interest is determined. In step 104, a best alternate path to the lowest cost path is determined. Referring to FIG. 6A, at a node 85, the lowest cost path (step 102) is path 87 (cost=70x) and a best alternative path (step 104) is path 86 (cost=80x). In step 106, the cost of the best alternate path is compared to a value stored in a BA field of the received Interest. If the cost of the best alternate path is less than the value stored in the BA field of the Interest, execution proceeds to step 108, in which the value in BA field is updated to equal the cost of the best alternate path. Referring again to FIG. 6A, the cost of the best alternate path (80x) is less than the value stored in the BA field (120x); therefore, the value of the BA field is changed from 120x to 80x. If the cost of the best alternate path is greater than the value stored in the BA field of the Interest, execution proceeds to step 110, in which the Interest is forwarded along the lowest x path. Similarly, upon completion of step 108, execution proceeds to step 110. The process illustrated in FIG. 6A continues unless and until congestion is detected at a node. Upon detection of congestion, a NACK is generated and transmitted along the reverse path, as described with reference to FIG. 6B below.

Figure 6B:
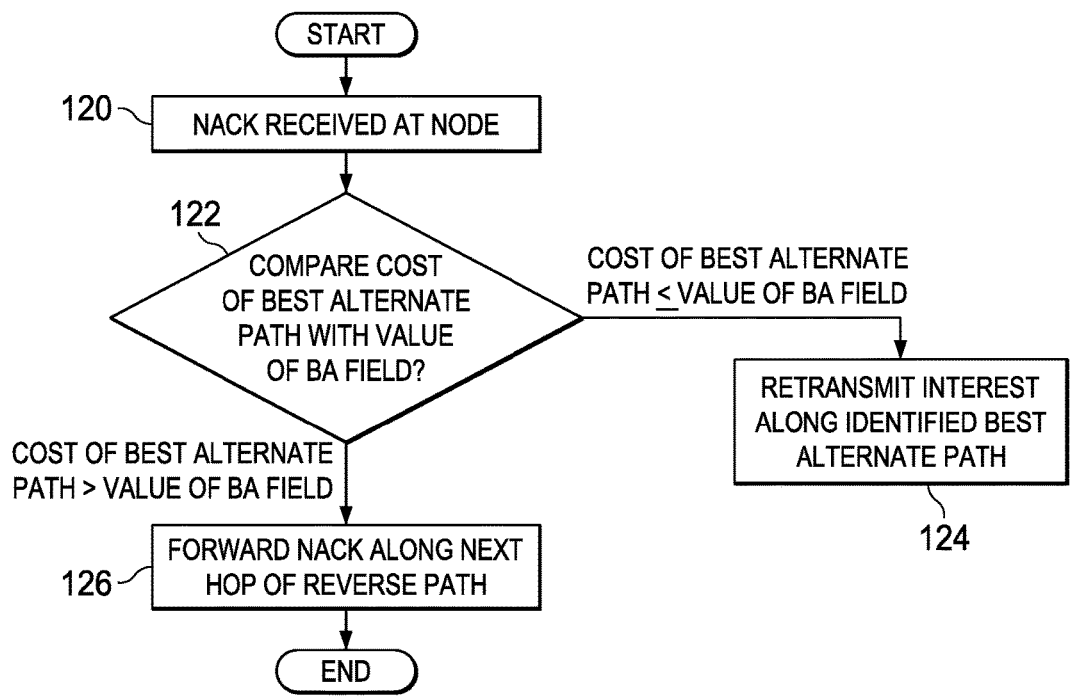
FIG. 6B is a flowchart of steps that may be implemented by the ICN network node of FIG. 2 for performing optimized in-network retransmission for information-centric networking protocols in accordance with embodiments described herein in connection with transmitting a NACK back toward a consumer for purposes of retransmission of the Interest.

FIG. 6B is a flowchart of steps that may be implemented by an ICN node, such as ICN node 20, for performing optimized in-network retransmission for information-centric networking protocols in accordance with embodiments described herein in connection with transmitting a NACK back toward a consumer for purposes of retransmission of the Interest. Referring to FIG. 6B, in step 120, a NACK is received at the node. In step 122, a value stored in the BA field of the NACK is compared to the cost of the best alternate path, wherein the best alternate path is the lowest cost alternative to the path that the Interest previously traversed to arrive at the node. If the value stored in the BA filed of the NACK is greater than or equal to the cost of the best alternate path, execution proceeds to step 124, in which the Interest is retransmitted along the identified best alternate path. If the value stored in the BA field of the NACK is less than the cost of the best alternate path, in step 126, the NACK is forwarded back along the path that the Interest previously traversed. Referring to FIG. 4B, at node 85, when the cost of the best alternate path (path 86; cost 80x) is compared to the value stored in the BA field (80x) at step 122, a determination is made that the best alternate path cost is equal to the BA field value. Accordingly, in step 124, the Interest is retransmitted along the best alternate path (path 86). Alternatively, if it were determined at step 122 that the value stored in the BA field was greater than the cost of the best alternate path, the NACK would be forwarded along the reverse path (path 84).

In summary, embodiments described herein include using signaled information to introduce non-local information into an in-network retransmission decision. The information signaled may be based on marginal delay, propagation delay and/or hop count, and signaling messages/protocol extensions are used to carry the information. The information to be signaled is gathered and an adjustment is made to the information at each node to reflect the link separating the sender and receiver of the information. Additionally, embodiments include an algorithm for retransmission next hop selection that reflects local information and information received via signaling. Moreover, information may possibly be stored at each node's PIT, taking advantage of ICN stateful forwarding. For example, if the cost is based on an average RTT, the PIT could be used to determine this value for each Interest/Data exchange, which could be aggregated into the average.

Embodiments described and illustrated herein facilitate globally near-optimal in-network retransmit decisions. In particular, the Interest message can keep track of the best alternate path toward a producer and updated it as the Interest message is forwarded upstream. Each node on the path can therefore keep track of the best alternate path toward the producer, taking advantage of ICN stateful forwarding. In the case of receipt by a chosen path of a NACK, retransmission will be sent form the next best option along the whole downstream path from the congestion point. Additionally, embodiments described and illustrated herein facilitate the capabilities while incurring minimal increase in Interest and NACK message sizes. To keep track of the downstream best alternative metric toward the producer using the embodiments described herein, the Interest message maintains a small field. If this filed is a header TLV, it will be noted that bytes will also be required for the T and L. Finally, embodiments described and illustrated herein require no additional signaling messages to be exchanged. The embodiments use only the existing Interest/NACK message exchange. No new messages are defined or used and no additional instances of existing messages are sent prior to the generation of the in-network Interest retransmit. Moreover the in-network retransmit feature described herein will ultimately reduce the number of messages sent compared to pure endpoint retransmission.

In example implementations, at least some portions of the activities related to the embodiments described herein may be implemented in software in, for example, a server, a router, etc. In some embodiments, this software could be received or downloaded from a web server, provided on computer-readable media, or configured by a manufacturer of a particular element in order to provide this system in accordance with features of embodiments described herein. In some embodiments, one or more of these features may be implemented in hardware, provided external to these elements, or consolidated in any appropriate manner to achieve the intended functionality.

It will be recognized that an ICN node, such as ICN node 20, may be implemented using one or more computer devices comprising software embodied in one or more tangible media for facilitating the activities described herein. The computer device may also include a memory device (or memory element) for storing information to be used in achieving the functions as outlined herein. Additionally, the computer device may include a processor that is capable of executing software or an algorithm to perform the functions as discussed in this Specification, including but not limited to the functions illustrated in and described with reference to FIGS. 6A and 6B. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and specifically illustrated in FIGS. 6A and 6B may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 6A and 6B. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Figure 7:
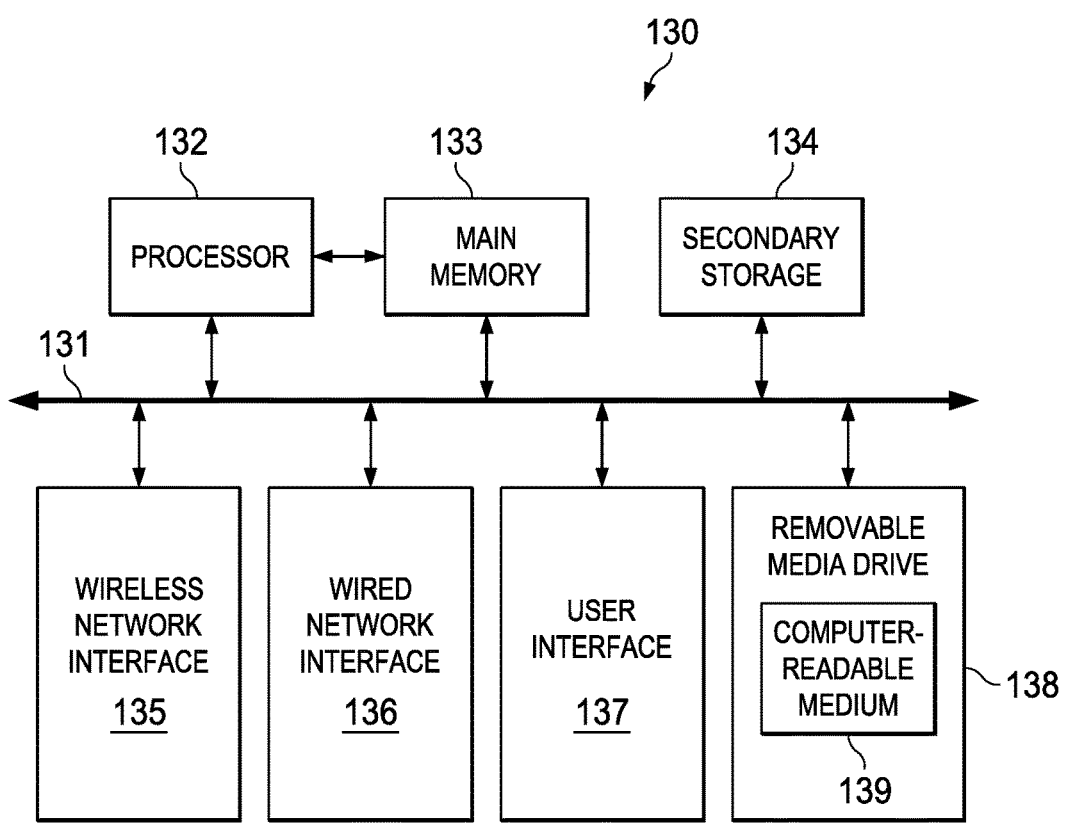
FIG. 7 is a simplified block diagram of a machine comprising an element of the communications networks embodying features described herein for implementing techniques for optimized in-network retransmission for information-centric networking protocols.

Turning to FIG. 7, FIG. 7 illustrates a simplified block diagram of an example machine (or apparatus) 130, which in certain embodiments may be an ICN node that may be implemented in embodiments described herein. The example machine 130 corresponds to network elements and computing devices that may be deployed in a communications network. In particular, FIG. 7 illustrates a block diagram representation of an example form of a machine within which software and hardware cause machine 130 to perform any one or more of the activities or operations discussed herein. As shown in FIG. 7, machine 130 may include a processor 132, a main memory 133, secondary storage 134, a wireless network interface 135, a wired network interface 136, a user interface 137, and a removable media drive 138 including a computer-readable medium 139. A bus 131, such as a system bus and a memory bus, may provide electronic communication between processor 132 and the memory, drives, interfaces, and other components of machine 130.

Processor 132, which may also be referred to as a central processing unit ("CPU"), can include any general or special-purpose processor capable of executing machine readable instructions and performing operations on data as instructed by the machine readable instructions. Main memory 133 may be directly accessible to processor 132 for accessing machine instructions and may be in the form of random access memory ("RAM") or any type of dynamic storage (e.g., dynamic random access memory ("DRAM")). Secondary storage 134 can be any non-volatile memory such as a hard disk, which is capable of storing electronic data including executable software files. Externally stored electronic data may be provided to computer 130 through one or more removable media drives 138, which may be configured to receive any type of external media such as compact discs ("CDs"), digital video discs ("DVDs"), flash drives, external hard drives, etc.

Wireless and wired network interfaces 135 and 136 can be provided to enable electronic communication between machine 130 and other machines, or nodes. In one example, wireless network interface 135 could include a wireless network controller ("WNIC") with suitable transmitting and receiving components, such as transceivers, for wirelessly communicating within a network. Wired network interface 136 can enable machine 130 to physically connect to a network by a wire line such as an Ethernet cable. Both wireless and wired network interfaces 135 and 136 may be configured to facilitate communications using suitable communication protocols such as, for example, IEEE 802.1. Machine 130 is shown with both wireless and wired network interfaces 135 and 136 for illustrative purposes only. While one or more wireless and hardwire interfaces may be provided in machine 130, or externally connected to machine 130, only one connection option is needed to enable connection of machine 130 to a network.

A user interface 137 may be provided in some machines to allow a user to interact with the machine 130. User interface 137 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 138 represents a drive configured to receive any type of external computer-readable media (e.g., computer-readable medium 139). Instructions embodying the activities or functions described herein may be stored on one or more external computer-readable media. Additionally, such instructions may also, or alternatively, reside at least partially within a memory element (e.g., in main memory 133 or cache memory of processor 132) of machine 130 during execution, or within a non-volatile memory element (e.g., secondary storage 134) of machine 130. Accordingly, other memory elements of machine 130 also constitute computer-readable media. Thus, "computer-readable medium" is meant to include any medium that is capable of storing instructions for execution by machine 130 that cause the machine to perform any one or more of the activities disclosed herein.

Not shown in FIG. 7 is additional hardware that may be suitably coupled to processor 132 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 130 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 130 to appropriately manage the operation of the hardware components therein.

The elements, shown and/or described with reference to machine 130, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

In one example implementation, ICN nodes are network elements or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 133, secondary storage 134, computer-readable medium 139) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 132) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment 10, 110, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving a notification at a node of a communications network;
   determining a lowest cost path for implementing a next hop for the notification;
   determining a best alternate path for implementing the next hop;
   comparing a cost of the best alternate path with a value stored in a header field of the notification;
   updating the value stored in the header field to equal the cost of the best alternate path if the cost of the best alternate path is less than the value stored in the header field;
   forwarding the notification along the lowest cost path;
   receiving a negative acknowledgement (NACK) at the node;
   comparing the cost of the best alternate path with a value stored in a header field of the NACK; and
   retransmitting the notification along the best alternate path if the value stored in the header field of the NACK is greater than or equal to the cost of the best alternate path.

2. The method of claim 1 wherein the notification is an Interest message.

3. The method of claim 1, wherein the communications network comprises an information-centric network ("ICN").

4. The method of claim 1, wherein the node comprises at least one of an ICN switch, an ICN router, and a forwarder.

5. The method of claim 1 further comprising:
   forwarding the NACK along the next hop of a reverse path of the notification if the cost of the best alternate path is greater than the value stored in the header field of the NACK.

6. The method of claim 1, wherein the NACK is generated responsive to congestion in the communications network impacting further transmission of the notification.

7. The method of claim 1, wherein the notification comprises a request for data.

8. The method of claim 1, wherein the cost is at least one of a bandwidth estimate, a smoothed average round trip time, and a hop count.

9. One or more non-transitory tangible media having encoded thereon logic that includes code for execution and when executed by a processor is operable to perform operations comprising:
   receiving a notification at a node of a communications network; determining a lowest cost path for implementing a next hop for the notification;
   determining a best alternate path for implementing the next hop;
   comparing a cost of the best alternate path with a value stored in a header field of the notification;
   updating the value stored in the header field to equal the cost of the best alternate path if the cost of the best alternate path is less than the value stored in the header field;
   forwarding the notification along the lowest cost path;
   receiving a negative acknowledgement (NACK) at the node;
   comparing the cost of the best alternate path with a value stored in a header field of the NACK; and
   retransmitting the notification along the best alternate path if the value stored in the header field of the NACK is greater than or equal to the cost of the best alternate path.

10. The media of claim 9, wherein the notification is an Interest message.

11. The media of claim 9, wherein the communications network comprises an information-centric network ("ICN").

12. The media of claim 9, wherein the node comprises at least one of an ICN switch, an ICN router, and a forwarder.

13. The media of claim 9, wherein the operations further comprise:
   forwarding the NACK along the next hop of a reverse path of the notification if the cost of the best alternate path is greater than the value stored in the header field of the NACK.

14. The media of claim 9, wherein the NACK is generated responsive to congestion in the communications network impacting further transmission of the notification.

15. The media of claim 9, wherein the notification comprises a request for data.

16. An apparatus comprising:
   a memory element configured to store data;
   a processor operable to execute instructions associated with the data; and
   an optimized in-network retransmission module configured to:
      receive a notification at a node of a communications network;
      determine a lowest cost path for implementing a next hop for the notification;
      determine a best alternate path for implementing the next hop;
      compare a cost of the best alternate path with a value stored in a header field of the notification;
      update the value stored in the header field to equal the cost of the best alternate path if the cost of the best alternate path is less than the value stored in the header field;
      forward the notification along the lowest cost path,
      receive a negative acknowledgement (NACK) at the node;
      compare the cost of the best alternate path with a value stored in a header field of the NACK; and
      retransmit the notification along the best alternate path if the value stored in the header field of the NACK is greater than or equal to the cost of the best alternate path.

17. The apparatus of claim 16, wherein the communications network is an Information-Centric Network ("ICN") and the notification is an Interest message.

18. The apparatus of claim 16, wherein the optimized in-network retransmission nodule is further configured to:

forward the NACK along the next hop of a reverse path of the notification if the cost of the best alternate path is greater than the value stored in the header field of the NACK.

19. The apparatus of claim 16, wherein the NACK is generated responsive to congestion in the communications network impacting further transmission of the notification.

20. The apparatus of claim 16, wherein the notification comprises a request for data.

* * * * *

UNITED STATES PATENT AND TRADEMARK OFFICE
CERTIFICATE OF CORRECTION

PATENT NO. : 10,069,736 B2
APPLICATION NO. : 15/144551
DATED : September 4, 2018
INVENTOR(S) : David R. Oran et al.

Page 1 of 1

It is certified that error appears in the above-identified patent and that said Letters Patent is hereby corrected as shown below:

In the Claims

Claim 16, Column 16, Line 54, please replace "cost path," with --cost path;--

Signed and Sealed this
Twenty-ninth Day of January, 2019

Andrei Iancu
*Director of the United States Patent and Trademark Office*